F. W. OFELDT.
VEHICLE WHEEL AND TIRE MEMBER THEREFOR.
APPLICATION FILED DEC. 26, 1911.
1,056,294.
Patented Mar. 18, 1913.
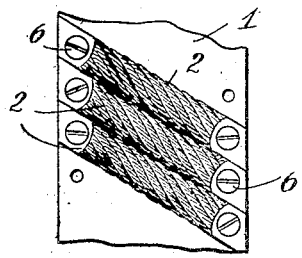
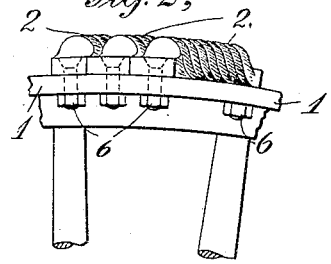
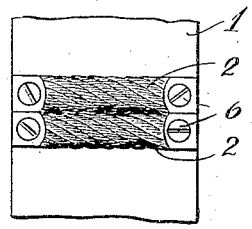
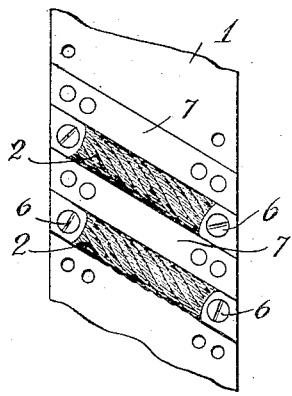
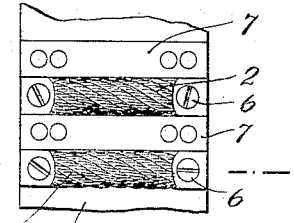
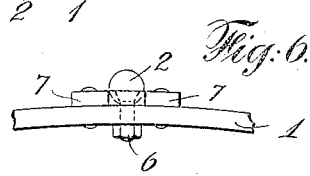
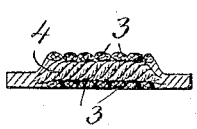
Witnesses:
Max B. A. Doring
Paul H. Frank
Inventor
Frank W. Ofeldt
By his Attorneys ically arranged bars of less height than
UNITED STATES PATENT OFFICE.

FRANK W. OFELDT, OF HOBOKEN, NEW JERSEY.

VEHICLE-WHEEL AND TIRE MEMBER THEREFOR.

1,056,294. Specification of Letters Patent. Patented Mar. 18, 1913.

Application filed December 26, 1911. Serial No. 667,930.

*To all whom it may concern:*

Be it known that I, FRANK W. OFELDT, a citizen of the United States of America, and a resident of Hoboken, county of Hudson, and State of New Jersey, have invented a certain new and useful Vehicle-Wheel and Tire Member Therefor, of which the following is a specification.

My invention relates to vehicle wheels and tire members therefor.

The improved wheel is particularly designed for use on heavy vehicles, such as heavy motor trucks, wherein great tire resiliency is not required, but great load-carrying capacity and ample traction is required.

According to my invention the rim of the wheel is provided with a plurality of transverse traction members consisting of short pieces of cable—wire cable by preference—having at their ends depressed portions by which such members are secured to the wheel rim. By preference, these traction members are located between strong transversely arranged bars of less height than the initial height of such traction members, but of height sufficient to prevent undue spreading of the said traction members.

The object of my invention is to provide an improved wheel, and an improved traction member therefor, of great load-carrying capacity, and of great durability, which shall provide ample traction between the wheel and the road bed, and shall be relatively inexpensive.

I will now proceed to describe my invention with reference to the accompanying drawings, and will then point out the novel features in claims.

In the drawings: Figure 1 shows an elevation of a portion of the rim of a wheel provided with traction members such as before referred to and Fig. 2 shows a longitudinal section of such portion of the rim, and traction members thereof, the traction members being shown, in Figs. 1 and 2, as arranged obliquely. Fig. 3 is a view similar to Fig. 2, but showing the traction members arranged parallel to the axis of the whee'. Fig. 4 is a view similar to Fig. 1, but showing reinforcing bars between which the traction members are located. Fig. 5 is a view similar to Fig. 3, but showing reinforcing bars between which a traction member is located; and Fig. 6 is a longitudinal section of the portion shown in Fig. 5. Fig. 7 shows a longitudinal section of one of the traction members.

Referring first to Figs. 1 and 2, the wheel there shown comprises a rim 1, preferably a metallic rim, upon which are mounted a plurality of traction members 2 consisting of short sections of cable—preferably wire cable composed of stranded members 3 wound helically about a core 4, the strands 3 and core 4 being welded together at the ends, such welded portions being flattened and depressed, and provided with holes through which and through corresponding holes in the rim 1, screw bolts 6 are passed, to hold these traction members to the rim. These traction members are arranged transversely with respect to the rim of the wheel, and may be arranged at a slight angle to the axis of the wheel, as illustrated in Figs. 1 and 2, or may be parallel to the axis of the wheel, as shown in Fig. 3.

At the present time most motor trucks and other motor vehicles designed to carry heavy loads, are provided either with solid rubber tires or with steel tires. Experience has shown that the life of the solid rubber tire is very brief when such tire is forced to carry heavy loads, while the cost of such tires is very great. Furthermore, while such solid rubber tires have sufficient adhesion to a dry road bed, they do not have sufficient adhesion when the road bed is slippery; as, for example, when the road bed is covered with ice or oil or slime. The durability of the steel tire is of course greater than that of the rubber tire, but the steel tire is without resiliency, and gives sufficient adhesion to the road bed only when such road bed is dry and is not slippery. I have found that wheels provided with traction members such as described, provide ample adhesion to the road bed and therefore ample traction, even when the road bed is quite slippery; that while somewhat less resilient than the rubber tire, they do provide a certain amount of resilience; that they wear for a long time before replacement is required—in fact, may be worn down to or nearly to the center before they need be replaced, and, their cost being low, they may be replaced at small expense. Furthermore, it is a simple matter to replace them. I have also found that they cause less injury to Macadam and like road beds than do the spurs with which metal-tired wheels are sometimes provided to secure adhesion to the road bed.

Preferably, and as indicated in Figs. 4–6 inclusive, these traction members 2 are located between solid metal bars 7 of a height approximating half the initial height of the traction members 2. These bars 7 prevent lateral spreading or flattening of the traction members 2, and so greatly prolong the life of such traction members.

What I claim is:—

1. A wheel comprising a substantially unyielding rim having secured to it traction members comprising transversely arranged sections of stranded cable secured at their ends to said rim and extending across the face of said rim, resting upon said face.

2. A wheel comprising a rim having upon it traction members comprising sections of cable having flattened and depressed end portions provided with means whereby said traction members may be secured to the rim.

3. A wheel comprising a rim having upon it traction members comprising lengths of metallic cable composed of strands united together at the ends of such members, the end portions of such members being flattened and depressed and provided with means whereby said members may be secured to the rim.

4. A wheel comprising a rim having upon it traction members comprising sections of cable, said rim also provided with bars located on opposite sides of such traction members and adapted to prevent undue spreading thereof.

5. A wheel comprising a rim having upon it traction members comprising lengths of metallic cable composed of strands united together at the ends of such members, said rim also provided with bars located on opposite sides of such traction members and of a height less than the initial height of such traction members and adapted to prevent undue spreading thereof.

6. A traction member for wheels consisting of a length of metallic cable composed of strands united together at the ends, the end portions of such traction member being flattened and depressed.

7. A traction member for wheels consisting of a length of metallic cable composed of strands united together at the ends, the end portions of such traction member being flattened and depressed, and provided each with a hole through which may be passed a bolt for the purpose of securing such member to a wheel rim.

In testimony whereof I have signed this specification in the presence of two subscribing witnesses.

FRANK W. OFELDT.

Witnesses:
 LEO J. MATTY,
 D. A. DAVIES.